Sept. 12, 1967　　　　E. NEUREUTER　　　　3,341,739
ELECTRONIC FLASH CIRCUIT FOR A CAMERA
Filed Oct. 18, 1965
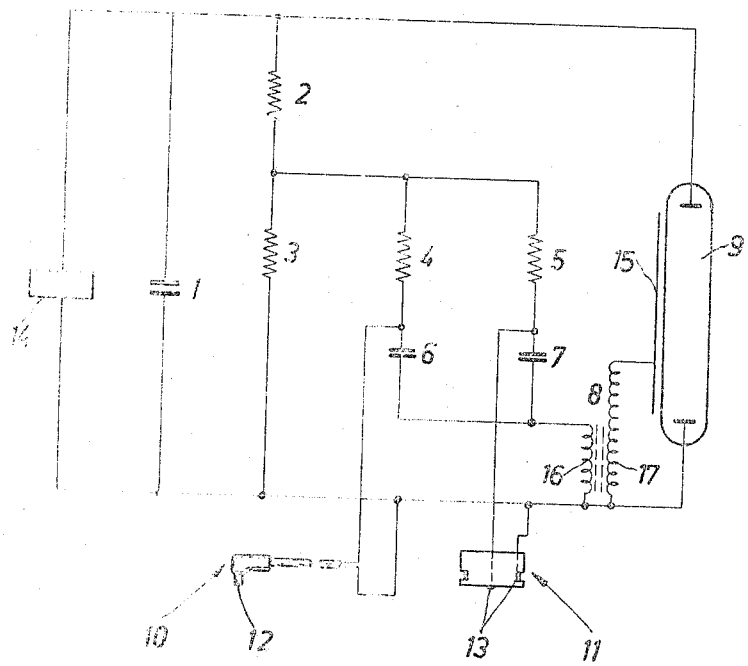
Inventor:
Erich Neureuter United States Patent Office 3,341,739
Patented Sept. 12, 1967

3,341,739
ELECTRONIC FLASH CIRCUIT FOR A CAMERA
Erich Neureuter, Berlin, Germany, assignor to Robert Bosch Elektronik und Photokino GmbH., Berlin-Wilmersdorf, Germany
Filed Oct. 18, 1965, Ser. No. 497,224
Claims priority, application Germany, Dec. 14, 1964, B 79,729
6 Claims. (Cl. 315—241)

The present invention relates to an electronic flash circuit for a camera. More particularly, the invention relates to an electronic flash circuit for use with cameras having different types of flash device connections.

The flash circuit is of the type utilizing a flash bulb which is ignited or fired by an ignition transformer the secondary winding of which is connected to the flash bulb. An ignition condenser which is charged via a resistor is connected in parallel with the primary winding of the ignition transformer. The ignition condenser is discharged by the closing of a pair of ignition contacts.

In the majority of flash devices now in service, the ignition contacts comprise a socket or plug at the end of a synchronizing cable electrically connected to the flash device. The synchronizing cable must then be connected to the synchronizing plug or socket of the camera by coupling the socket or plug of one with the plug or socket of the other. The synchronizing plug or socket is electrically connected to the camera shutter, so that when the socket or plug and the plug or socket are coupled by the photographer and are thus in electrical contact, tripping of the shutter closes the circuit of the ignition condenser and said condenser discharges and causes firing of the flash bulb.

A flash device is usually removably mounted on a camera by means of a support extension of the flash device which is pushed into or onto a receptacle on the outside of the camera. In the older types of flash device, the support extension and corresponding receptacle are mechanical only in function and may be of metal. They have no electrical connections and serve no electrical purpose. In the more recent types of flash device, the support extension of the flash device includes ignition contacts spaced from each other which make electrical contact with correspondingly positioned electrical contacts of the corresponding receptacle of the camera.

Thus, in the newer types of flash device the support extension and corresponding receptacle are both mechanical and electrical in function and the synchronizing cable of the older types of flash device is eliminated. The photographer utilizing the newer type of flash merely pushes the support extension of the flash device into or onto the corresponding receptacle to make the necessary circuit connections and has no other connections to make.

Many photographers have both the older and newer type cameras and flash devices, so that the newer type flash devices must be additionally provided with a synchronizing cable of the older type in order to adapt the flash device for use with both older and newer cameras. However, the two pairs of ignition contacts, of the synchronizing cable and of the support extension, may not be connected directly in parallel by the circuitry of the flash device, because the ignition contacts would be short-circuited when the support extension is coupled with the corresponding receptacle of an older camera. This is due to the fact that the corresponding receptacle of the older camera is metal, so that it short-circuits the electrical contacts of the support extension and also the electrical contacts of the socket or plug of the synchronizing cable. This makes flash bulb ignition or firing impossible.

Several solutions have been offered for the problem of avoiding short-circuiting upon use of a newer type flash device additionally equipped with an older type synchronizing cable, with an older type camera. In one system, the electrical contacts in the support extension are connected into the ignition circuit only through the synchronizing cable. When the photographer uses an older camera, he couples the socket or plug of the synchronous cable, which socket or plug includes a pair of ignition contacts, with the corresponding plug or socket of the camera. When the photographer uses a newer camera, he couples the socket or plug of the synchronous cable with the flash device which is provided with a corresponding plug or socket having two electrical contacts which are electrically connected to the pair of electrical contacts in the support extension. Thus, only the aforementioned electrical connections are made to the electrical contacts in the support extension. Coupling of the synchronizing cable with the corresponding plug or socket of the flash device connects the pair of ignition contacts in the support extension into circuit with the ignition condenser and ignition transformer.

In another system, two pairs of ignition contacts are provided. The circuit from the ignition condenser to the ignition contacts of the support extension is interrupted when the socket or plug of the additionally provided synchronizing cable is coupled with the corresponding plug or socket of an older type camera, since the other end of the synchronizing cable, which is usually connected to the flash device, is provided with a socket or plug which and is coupled with a corresponding plug or socket provided at the side of the support extension.

In another system, an adapter is provided for insertion by the photographer between a newer type flash device and an older camera. The synchronizing cable is coupled with the adapter. The adapter comprises a pair of ignition contacts which cooperate with the synchronizing cable but has no other contacts. In still another system, two pairs of ignition contacts are provided and a manually operated switch is interposed in the circuit between the ignition condenser and the ignition contacts of the support extension. The switch must be switched off when the flash device is utilized with an older camera and must be switched on when the flash device is utilized with a newer camera.

In the aforementioned systems offered as solutions for the problem of short-circuiting, the photographer must perform at least one additional operation in utilizing the newer type flash device with an older camera. If the photographer fails to couple the synchronizing cable to the flash device in the system of the first-mentioned solution, the flash bulb would not fire when a newer camera is used. The photographer must decouple the synchronizing cable from the support extension of the flash device when utilizing the system of the second-mentioned solution with an older camera. In the system of the third-mentioned solution, the photographer must insert the adapter when using an older camera and must remove the adapter when a newer camera is used. Furthermore, the adapter increases the height dimension of the camera and flash arrangement. The photographer must operate the switch in the system of the last-mentioned solution.

In any of these solutions, the photographer must be especially careful to make the necessary adjustment for the camera he uses. Furthermore, the contact arrangements utilized with two pairs of ignition or electrical contacts are expensive to manufacture and sometimes create difficulties.

The principal object of the present invention is to provide a new and improved electronic flash circuit for a camera.

An object of the present invention is to provide a flash circuit for use with cameras having different types of flash device connections.

Another object of the present invention is to provide a flash circuit which may be utilized without additional ignition contacts for connecting a newer type flash device to an older type camera or to a newer type camera.

Another object of the present invention is to provide a flash circuit which may be utilized with older or newer type cameras and which is simple in structure and inexpensive to manufacture.

Another object of the present invention is to provide a flash circuit which may be utilized efficiently, effectively and reliably with older or newer type cameras.

Another object of the present invention is to provide a flash circuit which may be utilized with great facility and without an additional operation with older or newer type cameras.

In accordance with the present invention, the flash circuit for a camera comprises a flash bulb having a pair of spaced discharge electrodes and an ignition electrode. A storage condenser is connected across the flash bulb to the discharge electrode thereof. A source of voltage is connected in parallel with the storage condenser for charging the storage condenser, the storage condenser being discharged through the flash bulb when the flash bulb is ignited. An ignition transformer has a primary winding and a secondary winding connected to the ignition electrode of the flash bulb. A first ignition condenser is connected to the primary winding. A first resistor connects the first ignition condenser to the source of voltage for charging via the primary winding, the first resistor, the first ignition condenser and the primary winding being connected in series across the source of voltage. A second ignition condenser is connected to the primary winding. A second resistor connects the second ignition condenser to the source of voltage for charging via the primary winding, the second resistor, the second ignition condenser and the primary winding being connected in series across the source of voltage. A first discharge circuit is connected to the first ignition condenser for discharging the first ignition condenser through the primary winding thereby igniting the flash bulb via the secondary winding and the ignition electrode in a first condition of operation. A second discharge circuit is connected to the second ignition condenser for discharging the second ignition condenser through the primary winding thereby igniting the flash bulb via the secondary winding and the ignition electrode in a second condition of operation. The first condition of operation prevents charging of the second ignition condenser and the second condition of operation prevents discharging of the first ignition condenser.

In order that the present invention may be readily carried into effect, it will now be described with reference to the accompanying drawing, wherein the single figure is a circuit diagram of an embodiment of the electronics flash circuit of the present invention.

In the figure, a storage condenser 1 is charged to a high DC voltage by a voltage source 14 and discharges a high magnitude current through a flash bulb 9 connected in parallel therewith when said flash bulb is supplied with an ignition or firing pulse at its ignition electrode 15. The ignition or firing pulse is supplied to the ignition electrode 15 of the flash bulb 9 via an ignition transformer 8 having a primary winding 16 and a secondary winding 17 connected to the ignition electrode 15 of the flash bulb 9.

The ignition or firing pulse is provided by either of two ignition condensers 6 and 7. The ignition condenser 6 is charged by the voltage source 14 via a voltage divider 2, 3, a large resistance value resistor 4 and the primary winding 16 of the ignition transformer 8, and discharges when the electrical or ignition contacts 12 of the socket or plug of the synchronizing cable 10 of the flash device are connected to the corresponding contacts of the corresponding plug or socket of an older type camera and the shutter of such camera is tripped. The ignition condenser 6 discharges through the primary winding 16 of the ignition transformer 8 to fire or ignite the flash bulb 9.

The ignition condenser 7 is charged by the voltage source 14 via the voltage divider 2, 3, a large resistance value resistor 5 and the primary winding 16 of the ignition transformer 8, and discharges when the electrical or ignition contacts 13 of the support extension 11 of the flash device are connected to the corresponding contacts of the corresponding receptacle of a newer type camera and the shutter of such camera is tripped. The ignition condenser 7 discharges through the primary winding 16 of the ignition transformer 8 to fire or ignite the flash bulb 9.

When the flash device comprising the circuit of the present invention is utilized with a newer type camera, the support extension 11 thereof is coupled with the corresponding receptacle of the camera and the electrical contacts 13 of said support extension are placed in electrical contact with the corresponding electrical contacts of said corresponding receptacle. When the shutter of the camera is tripped, the circuit between the electrical contacts 13 is closed and the ignition condenser 7 is discharged via said electrical contacts and the primary winding 16. The additionally provided synchronizing cable 10 is not connected via its socket or plug and is merely left hanging from the flash device. The synchronizing cable 10 may then either be stored in the flash device, wound about a member provided for that purpose, inserted into a recess provided for that purpose in the flash device, or coupled with a corresponding plug or socket which is electrically nonconductive.

When the flash device comprising the circuit of the present invention is utilized with an older type camera, the support extension 11 thereof is coupled with the corresponding receptacle of the camera. The corresponding receptacle of the older type camera is of metal and short-circuits the electrical contacts 13 of the support extension 11. The socket or plug of the synchronizing cable 10 is coupled with the corresponding plug or socket of the camera so that the electrical contacts 12 of said synchronizing cable are placed in electrical contact with the corresponding electrical contacts of the corresponding plug or socket of the camera. When the shutter of the camera is tripped, the circuit between the electrical contacts 12 is closed and the ignition condenser 6 is discharged via said electrical contacts and the primary winding 16. Since the electrical contacts 13 of the support extension 11 are short-circuited, the ignition condenser 7 cannot be charged by the voltage source 14 because said battery is short-circuited via the resistor 2, the resistor 5 and the electrical contacts 13.

The flash circuit of the present invention operates effectively, efficiently, and reliably, since neither of the parallel connected ignition condensers 6 and 7 adversely affects the other. The flash circuit of the present invention may be utilized with great facility and without an additional operation with older or newer type cameras. Furthermore, there are no difficulties or special operations to be undertaken in changing from an older to a newer or from a newer to an older camera. The flash circuit of the present invention may be readily adapted for use with a battery as the voltage source 14.

Although the flash circuit of the present invention utilizes an additional resistor and an additional ignition condenser, it eliminates the need for additional components such as mating receptacles, sockets or plugs, adapters or switches. Such components are expensive to manufacture because they comprise small parts which must fit precisely. Furthermore, such components are susceptible to contact difficulties due to wear and dust after a period of operation. Resistors and condensers, on the other hand, are manufactured in bulk and are therefore inexpensive and reliable in operation.

While the invention has been described by means of a specific example and in a specific example, I do not wish to be limited thereto, for obvious modifications will occur to those skilled in the art without departing from the spirit and scope of the invention.

What I claim is:
1. A flash circuit for a camera, comprising:
a flash bulb having a pair of spaced discharge electrodes and an ignition electrode;
a storage condenser connected across said discharge electrodes of said flash bulb;
a source of voltage connected in parallel with said storage condenser for charging said storage condenser, said storage condenser being discharged through said flash bulb when said flash bulb is ignited;
an ignition transformer having a primary winding and a secondary winding connected to the ignition electrode of said flash bulb;
a first ignition condenser connected to said primary winding;
first resistor means connecting said first ignition condenser to said source of voltage for charging via said primary winding, said first resistor means, said first ignition condenser and said primary winding being connected in series and across said source of voltage;
a second ignition condenser connected to said primary winding;
second resistor means connecting said second ignition condenser to said source of voltage for charging via said primary winding, said second resistor means, said second ignition condenser and said primary winding being connected in series and across said source of voltage, the series connection of said first condenser and said first resistor means being in parallel with the series connection of said second condenser and said second resistor means;
first discharge contact means connected across said first ignition condenser and said primary winding for discharging said first ignition condenser through said primary winding by short-circuiting said first contact means and thereby igniting said flash bulb via said secondary winding and said ignition electrode in a first condition of operation; and
second discharge contact means connected across said second ignition condenser and said primary winding for discharging said second ignition condenser through said primary winding by short-circuiting said second contact means and thereby igniting said flash bulb via said secondary winding and said ignition electrode in a second condition of operation, said first condition of operation preventing charging of said second ignition condenser and said second condition of operation preventing discharging of said first ignition condenser.

2. A flash circuit for a camera as claimed in claim 1, wherein said first discharge means comprises a first electrical connection to a common point in the connection between said first resistor means and said first ignition condenser, a second electrical connection to a common point in the connection between the primary winding and said source of voltage and coupling means on said electrical connections for selectively short-circuiting said first and second electrical connections.

3. A flash circuit for a camera as claimed in claim 1, wherein said second discharge means comprises a third electrical connection to a common point in the connection between said second resistor means and said second ignition condenser, a fourth electrical connection to a common point in the connection between the primary winding said source of voltage and coupling means on said electrical connections for selectively short-circuiting said third and fourth electrical connections.

4. A flash circuit for a camera as claimed in claim 2, wherein said second discharge means comprises a third electrical connection to a common point in the connection between said second resistor means and said second ignition condenser, a fourth electrical connection to a common point in the connection between the primary winding said source of voltage and coupling means on said electrical connections for selectively short-circuiting said third and fourth electrical connections.

5. A flash circuit for a camera as claimed in claim 1, including voltage divider means connected across said source of voltage and to said first and second resistor means for dropping the potential output of said source of voltage.

6. A flash circuit for a camera as claimed in claim 1, wherein said voltage divider means comprises two resistors connected in series at a junction point, said junction point being also connected to said first and second resistor means.

References Cited

UNITED STATES PATENTS 2,953,675　9/1960　Kluge _____ 315—241
3,116,671　1/1964　Schankler _____ 315—241

FOREIGN PATENTS 864,659　1/1953　Germany.

JOHN W. HUCKERT, *Primary Examiner.*

J. D. CRAIG, *Assistant Examiner.*